(No Model.)

E. D. EAMES.
HOSE OR TUBING.

No. 314,440. Patented Mar. 24, 1885.

Witnesses:
A. Ruppert.
E. Cruse.

Inventor:
Elisha D. Eames,
by Gtt W. Hwig
atty.

N. PETERS. Photo-Lithographer, Washington, D. C.

UNITED STATES PATENT OFFICE.

ELISHA D. EAMES, OF WATERTOWN, NEW YORK.

HOSE OR TUBING.

SPECIFICATION forming part of Letters Patent No. 314,440, dated March 24, 1885.

Application filed November 10, 1884. (No model.)

*To all whom it may concern:*

Be it known that I, ELISHA D. EAMES, of Watertown, in the county of Jefferson and State of New York, have invented certain new and useful Improvements in Hose or Tubing, of which the following is a specification, reference being had to the accompanying drawings, and to the letters of reference marked thereon.

This invention has special reference to an improvement in hose for use in vacuum, air, or other brakes for railroads in which hose is employed. Such hose is usually made of rubber combined with cloth or other fabric, and strengthened interiorly with coiled wire or by other means.

In hose of this class, particularly such as is used for vacuum-brakes, a difficulty has been heretofore experienced in procuring hose having both the necessary strength and pliability. It has been found that if the material is of sufficient thickness to give the hose the strength requisite to sustain its weight, with that of the coupling, &c., the hose cannot be made flexible enough. The coiled wire, when entirely embedded in the rubber and the material, consisting of rubber, cloth, &c., surrounding the wire, will not expand on the outside or contract on the inside of the bend. The result has been that in the ordinary usage to which the hose is subjected the wire has either been forced out of its bed or crimped permanently, thus greatly impairing the value of the hose.

One feature of my invention is designed to produce a hose of greater strength and pliability than has been heretofore made.

Another feature of the invention is designed to provide sections of hose adapted for vacuum, air, or other railroad-brakes with enlarged ends, so that the sections can be drawn over the coupling or pipe and readily made air-tight.

Figure 1:
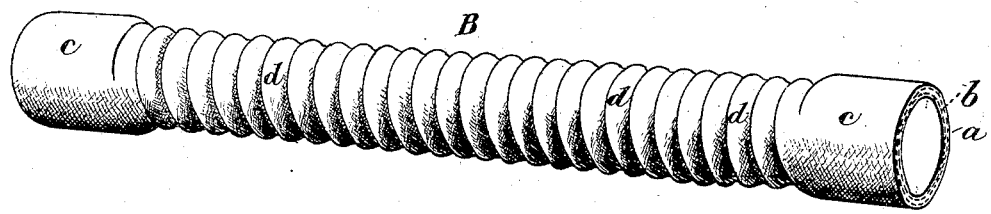
Figure 2:
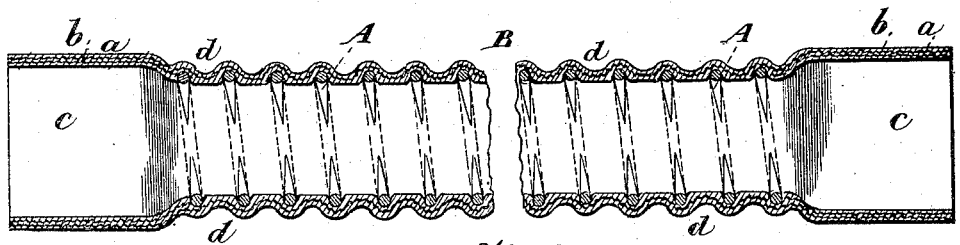
Figure 3:
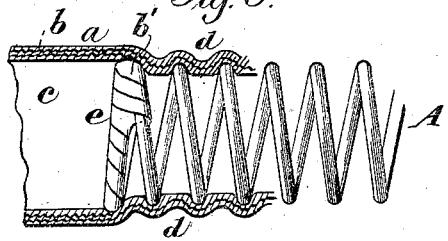
Figure 4:
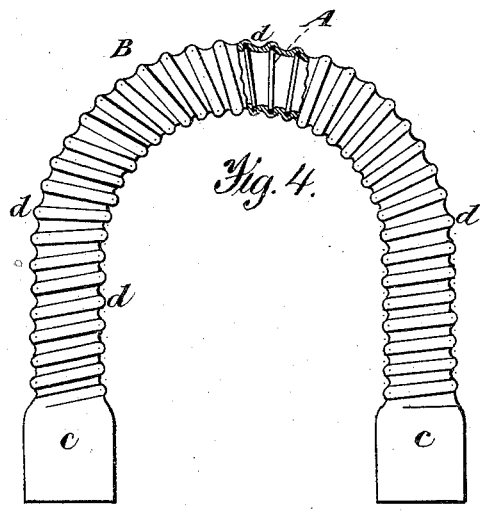

In the accompanying drawings, Figure 1 is a perspective view showing the exterior of a section of hose embodying my improvement. Fig. 2 is a longitudinal section. Fig. 3 is a view showing a detail of construction. Fig. 4 shows the section of hose bent.

Similar letters of reference indicate similar parts in the respective figures.

A is a coil of wire, which is made heavier than coils ordinarily used in such hose. The coils are placed farther apart than in ordinary usage.

The body of the hose is represented by B, which is of rubber combined with cloth or canvas, the rubber $a$, while in a plastic or liquid state, being united to the cloth or canvas $b$.

It will be seen that the coil of wire is embedded in the hose to its full diameter.

The pliability above referred to is given to the hose by molding or forming in it a series of expansible folds or corrugations, (represented by $d$.) The effect of this construction is to allow the section of hose to be readily bent, as shown in Fig. 4, the corrugations at the inner side of the bend being drawn together or compressed, while those at the outer side of the bend are expanded. It will be understood that the coils of wire are also brought or compressed more closely together on the inner side of the bend and spread upon the outer side thereof.

The second feature of the invention consists in making each end $c$ of the section of greater diameter than the intermediate portion, and stopping off the coil of wire A several inches from the end of the section of the hose. The end of the wire is wrapped with a cloth or canvas, $b'$, separate from the cloth in the body of the hose, the said end of the wire being fastened to the adjacent coil, as shown at $e$. Each enlarged end $c$ of the section is finished smooth inside and out and of uniform thickness, being thus adapted to fit the couplings and the clips for securing them.

The invention above described provides a strong and pliable hose-section for the purposes mentioned, and one at all times adapted to be conveniently and tightly applied to the coupling devices.

I claim as my invention—

1. A rubber or composite hose-section provided with expansible folds or corrugations and an internal embedded wire coiled to correspond with each fold, substantially as set forth, whereby strength and pliability are obtained.

2. A rubber-and-cloth hose-section provided with expansible folds or corrugations and an internal embedded wire coiled to correspond with each fold, the wire being stopped off near each end of the section, and the end of the wire wound with a cloth and fastened to the adjacent coil, substantially as set forth.

3. A rubber or composite hose-section provided with expansible folds or corrugations and enlarged plain end portions, combined with an internal embedded wire coiled to correspond with each fold, the said wire being stopped off some distance from each end of the section and secured, substantially as set forth.

In testimony whereof I have hereunto set my hand and seal.

ELISHA D. EAMES. [L. S.]

Witnesses:
W. F. SINGER,
J. ATWELL, Jr.